June 27, 1972 C. J. STALEGO 3,672,857
APPARATUS FOR PRODUCING GLASS FILAMENTS WITH
AUXILIARY HEATING MEANS
Filed April 27, 1970 2 Sheets-Sheet 1

INVENTOR.
CHARLES J. STALEGO
BY
Staelin + Overman
ATTORNEYS

June 27, 1972  C. J. STALEGO  3,672,857
APPARATUS FOR PRODUCING GLASS FILAMENTS WITH
AUXILIARY HEATING MEANS
Filed April 27, 1970  2 Sheets-Sheet 2

INVENTOR.
CHARLES J. STALEGO
BY
Staelin + Overman
ATTORNEYS

_United States Patent Office_

3,672,857
Patented June 27, 1972

3,672,857
APPARATUS FOR PRODUCING GLASS FILAMENTS WITH AUXILIARY HEATING MEANS
Charles J. Stalego, Newark, Ohio, assignor to Owens-Corning Fiberglass Corporation
Filed Apr. 27, 1970, Ser. No. 31,904
Int. Cl. C03b 37/00
U.S. Cl. 65—12                                                14 Claims

ABSTRACT OF THE DISCLOSURE

Apparatus for producing glass filaments wherein streams of molten glass material flow through an array of orificed tips projecting from a heated bushing. The streams of molten glass material are then attenuated into filaments. A uniform filament forming environment is attained by employing a fence adjacent boundary tips in the array of tips to heat such boundary tips by radiation, reflection or conduction. The fence is heated independently of the bushing so that a controlled quantity of heat is supplied to the boundary tips to compensate for losses which may vary with varying ambient conditions. The fence may be shaped to direct heat toward the boundary tips.

BACKGROUND OF THE INVENTION

This invention relates to glass filament forming and more particularly to apparatus for providing a uniform thermal environment at each of a plurality of orificed, filament forming tips on a heated bushing.

It is well known in the art to produce filaments from various thermoplastic and heat softenable materials, and especially glass, by flowing streams of molten material from a plurality of orificed tips provided on the bottom side of a heated bushing, feeder or reservoir. In the case of glass, the streams are attenuated, usually by mechanical means, into filaments which are then gathered and processed into a variety of commercial products.

By reason of cohesive and surface tension forces, as each stream of molten glass emanates from an orificed tip it tends to taper into a cone-like body. A filament is attenuated and pulled from the region of the apex of each cone-like body. Experience in the manufacture of glass filaments has indicated that the viscosity range of the glass wherein attenuation may be accomplished is somewhat limited. It has been found that if the glass temperature is too high, the glass viscosity will be too low and the glass will have a tendency to form into beads or to flood erratically from the orifices in an upwardly direction. If the temperature is too low and the viscosity of the glass is too high, the filament diameters are so diminished that they become unacceptable or their continuity is broken. Since glass viscosity is closely related to temperature, the need for precise glass temperature control in the region of filament attenuation is apparent. It is further evident that success in precisely controlling this temperature depends largely on the ability to uniformly control the thermal environment surrounding the molten glass streams as they are exposed to the atmosphere.

In the past, the thermal environment in the filament forming zone below the bushing has been controlled reasonably well by using an associated gas cooling or heat transfer apparatus. This approach has served also to promote an acceptable degree of thermal stability in the glass cones with respect to each other but under certain conditions, such as enlarged bushings, filament quality has been somewhat difficult to maintain as a result of the nonuniform thermal environment of a few remotely positioned tips. For example, in an array of equal spaced orificed tips, the outermost or boundary tips of the overall pattern do not receive the same amounts of radiant heat as do the ones interiorly located. In essence, the inner tips are recipients of heat from all immediately surrounding active tips whereas the outer tips are generally exposed in part to a relatively cool ambient environment. The existence of differentials in forming tip temperatures results in the production of filaments having varying and inconsistent diameters and characteristics. This, of course, cannot be tolerated in the manufacture of fibrous glass products.

Attempts have been made in the past to provide a uniform thermal environment at all filament forming tips. One solution described in Fiedler Pat. 3,068,669 was to mold a heat radiating strip in the bushing bottom to extend around the tips. The strip, which is heated by conduction from the bushing bottom, radiates heat energy to boundary tips. However, there is no external control over the heat energy supplied by the heat radiating strip to the boundary tips, and the best bushing materials may be poor heat radiators. Another suggested solution has been to plug up the boundary tips such that all active tips are surrounded by similar patterns of heat radiating tips. This solution, however, significantly decreases the number of fibers which the bushing is capable of producing.

SUMMARY OF THE INVENTION

According to the present invention, it has been discovered that a uniform thermal environment may be provided for filament forming orificed tips on a bushing by using a fence to supply additional heat to boundary tips to compensate for additional heat losses by the boundary tips. In one embodiment, the fence is heated either by electricity, by a fuel burner, or by a heat transfer fluid. In each case, the temperature of the fence is controllable externally of the bushing. The heated fence is either positioned adjacent the boundary tips to supply additional heat to such boundary tips by radiation, or it is welded or otherwise attached to the boundary tips to supply additional heat to the boundary tips by both radiation and conduction. In a second embodiment, the fence is attached to a refractory bushing support for reflecting radiated heat to the boundary tips. The fence has a surface which is highly reflective of radiated heat energy and is preferably shaped to direct or focus the reflected heat on the boundary tips. In addition to reflecting heat energy, the fence may be controllably heated to radiate heat to the boundary tips.

Accordingly, it is the primary object of the present invention to provide a uniform thermal environment adjacent a plurality of filament forming orificed tips on a bushing for forming glass filaments.

Another object of the invention is the provision of apparatus for simultaneously forming a plurality of substantially uniform glass filaments.

Other objects and advantages of the invention will become apparent from the following detailed description, with reference being made to the accompanying drawings.

BRIEF DESCRIPTION OF THE DRAWINGS

FIG. 4 is a fragmentary bottom view of a bushing including an electrically heated fence which is attached directly to boundary tips;

DESCRIPTION OF THE PREFERRED EMBODIMENTS

Figure 1:
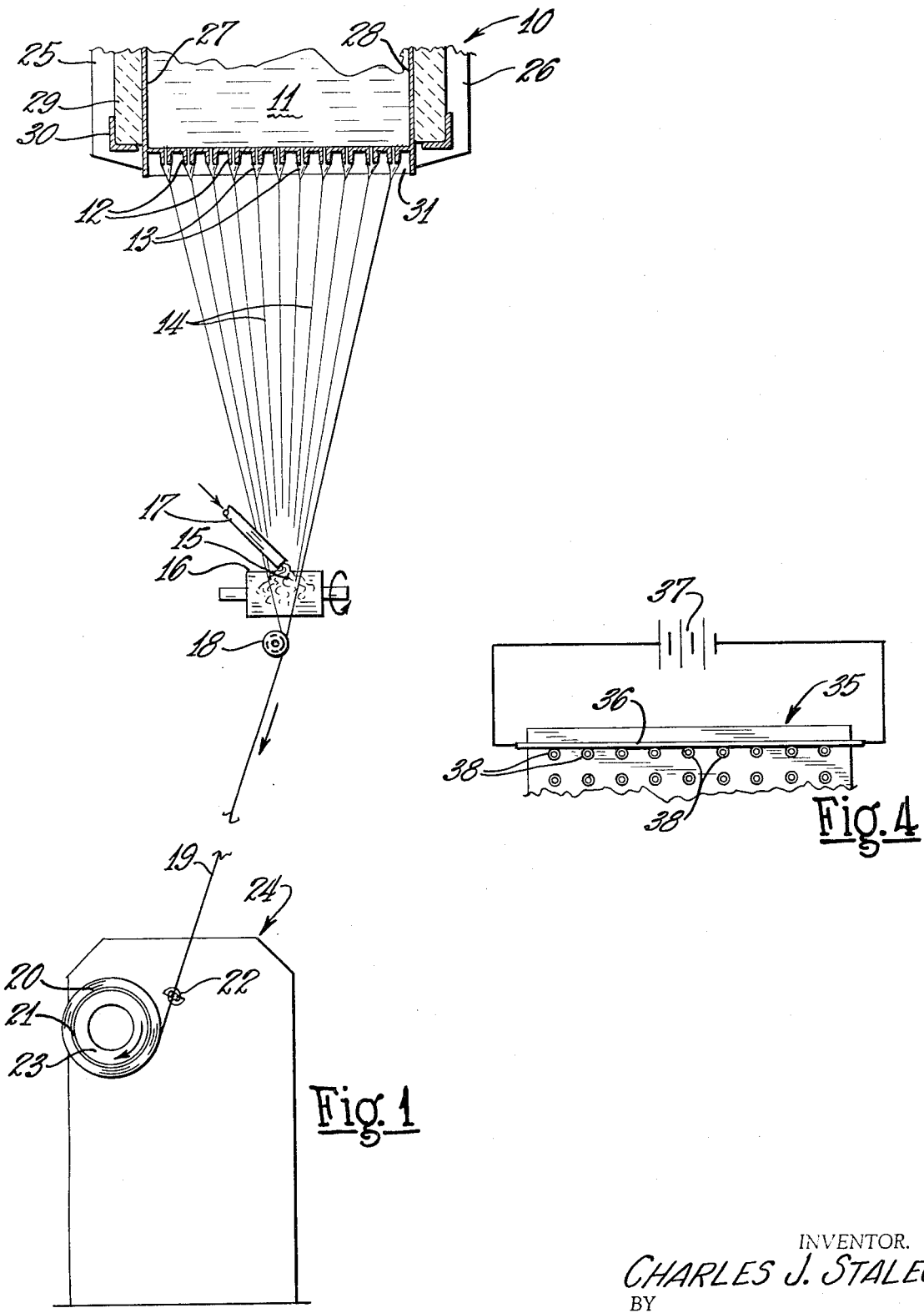
FIG. 1 is a fragmentary front elevational view showing apparatus, including the instant invention, for the production of continuous glass filaments.

Referring now to FIG. 1, there is shown a bushing, feeder or reservoir 10 for forming glass fibers or filaments. The bushing 10 holds a pool of molten glass 11, or other suitable heat softenable material, which flows downwardly through an array of hollow projections or orificed tips 12. Below each tip 12, the molten glass forms a cone-like body 13, which is attenuated into a continuous fiber or filament 14 to which a binder or sizing 15 is supplied by a roll 16. The binder 15 is supplied to the applicator roll 16 in metered fashion by a conduit 17.

After formation, the filaments 14 are gathered by a shoe 18 into a composite or strand 19 which is ultimately wound into a package 20 by a rotating tube 21. A traversing or level wind mechanism 22 is rotated against the strand 19 to distribute it reciprocally and longitudinally across the outer surface of the tube 21 as it rotates. The tube 21 is removably mounted on a drum or collet 23 which is rotatably mounted on a winder 24. The collect 23 and the tube 21 are rotated by a motor and an interconnecting guard mechanism (not shown) at a relatively high angular velocity such that a suitable filament attenuation force is generated. Normally, the filament attenuation occurs while pulling the strand at a linear speed within the range of 12,000 to 15,000 feet per minute.

The glass or other suitable heat softenable material 11 is supplied to the bushing 10 in molten form or in the form of batch, marbles or cullet. Heating of the molten glass 11 is accomplished resistively in a conventional manner by applying a controlled voltage across two terminals 25 and 26 on opposite ends 27 and 28, respectively, o fthe bushing 10. The bushing 10 is fabricated from an electrically conductive material, e.g., platinum, rhodium alloys, etc., capable of withstanding high temperatures and the abrasiveness of molten material such as molten glass. The exterior sides of the bushing 10 are surrounded by a high temperature insulating refractory 29 which is supported by an exterior frame 30.

Since molten glass is maintained in the feeder 10 at a relaitvely high temperature to enhance uniform flow through the tips 12, a subsequent reduction in temperature must be effected to bring the glass viscosity within a suitable attenuation range. A portion of the necessary heat loss is derived from the atmospheric dissipation of that heat which is conducted through the walls of the tips 12. This is facilitated by small amounts of air naturally flowing adjacent to the lower face of the bushing 10. To stabilize the temperature across all of the array of tips 12, a fence 31 is positioned adjacent outside or boundary tips. The fence 31 is designed to supply additioinal heat to the boundary tips to compensate for higher heat losses to the cool atmosphere surrounding the bushing 10. Since heat radiation from each tip 12 influences the attenuation viscosity of glass flowing from all neighboring tips, it is important to minimize or compensate for heat losses from the boundary tips to the surrounding atmosphere. If, for example, boundary tips are operated at a cooler temperature than interior tips, the glass viscosity will be higher at the boundary tips, resulting in the production of significantly finer fibers at the boundary tips.

Figure 2:
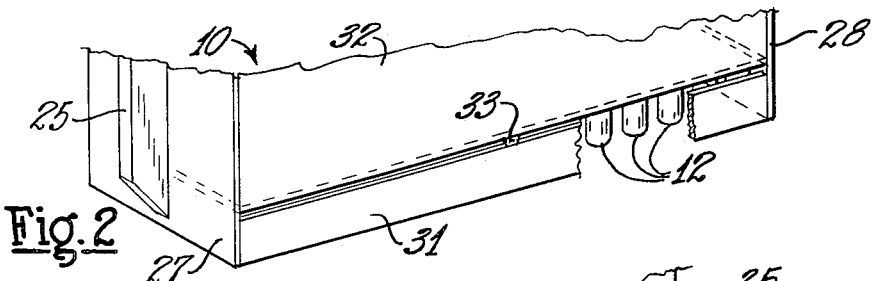
FIG. 2 is a fragmentary view, in perspective, of a glass filament forming bushing including a first embodiment of the invention.

Referring now to FIG. 2, a portion of the bushing 10 is shown in detail. Two fences 31 are connected between the bushing ends 27 and 28 such that the fences 31 are connected electrically in parallel with the bushing 10. Thus when a power source is connected between the bushing terminals 25 and 26, current will flow through both the bushing 10 and the fences 31 for heating both simultaneously. The portion of the total current flowing in and consequently resistively heating each fence 31 is to a major extent determined by the dimensions of the fence 31 and by the fence material. The current is controlled to a lesser extent by controlling the point at which clamp terminals (not shown) from a bushing power source are attached to the bushing terminals 25 and 26. If the clamp terminals are attached toward the upper portion of the bushing terminals 25 and 26, the fence 31 will operate at a relatively low temperature compared to the bushing temperature. If the clamp terminals are attached to the lower portion of the bushing terminals 25 and 26, the fence 31 will operate at a significantly higher temperature. The affect of the position of the clamp terminals is greater than would normally be expected because of the extreme current densities in the bushing 10 and the fences 31. This means for controlling bushing temperature is described in greater detail in Roberson et al. Pat. 3,305,332. The fence 31 may be rigidly attached to a bushing side 32 by one or more spot welds 33.

Figure 3:
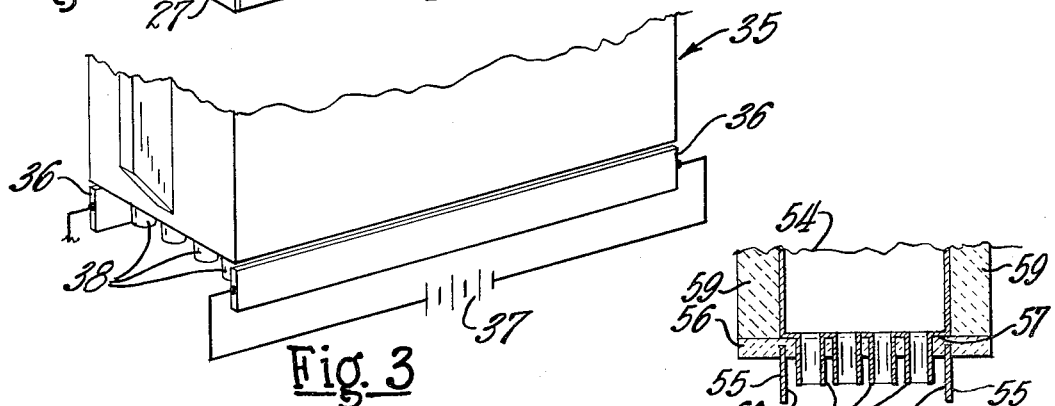
FIG. 3 is a fragmentary view, in perspective, of a glass filament forming bushing including a second embodiment of the invention.

Turning now to FIGS. 3 and 4, a modified bushing 35 is shown wherein two fences 36 are electrically heated by a power source 37 other than the power source which heats the bushing 35. With this arrangement, the power source 37 can be readily controlled by a variable resistance to establish a desired fence temperature without affecting the electrical current flow through the bushing 35. The fence 36 can be mounted adjacent to, but spaced from, boundary tips 38, or it can be attached directly to the boundary tips 38, as shown in FIG. 4 where the fence is welded to the boundary tips 38. When the fence is attached to the boundary tips 38, heat passes to the tips 38 by radiation and conduction.

Figure 5:
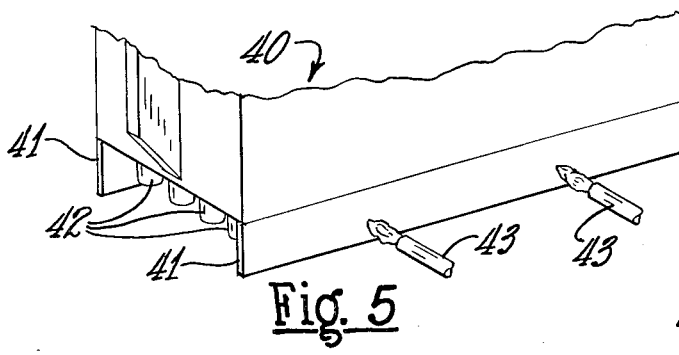
FIG. 5 is a fragmentary view, in perspective, of a bushing including a fence heated by a fuel burner.

A third embodiment of the invention is shown in FIG. 5, wherein a bushing 40 is shown. The bushing 40 is equipped with one or more fences 41 adjacent boundary tips 42 which are heated by either fuel burners 43 or other suitable sources of hot gas. If prior to entering the bushing 40, the glass is melted in a forehearth including a fuel burner, the hot products of combustion may be used as a source of hot gas for heating the fences 41. The fences 41 serve to distribute and evenly radiate heat from the burners 43 to the boundary tips 42, while preventing the tips 42 from being rapidly oxidized.

Figure 6:
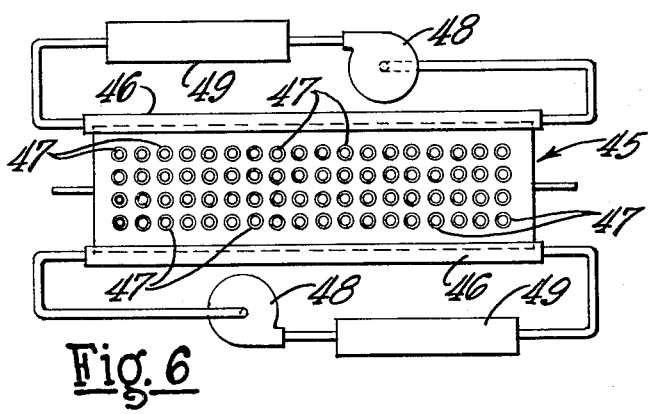
FIG. 6 is a bottom view of a filament forming bushing including a fence which is heated by a heat transfer fluid.

Referring now to FIG. 6, a bushing 45 is shown with hollow fences 46 adjacent boundary tips 47. Pumps 48 circulate a suitable heat transfer fluid through heaters 49 and the fences 46 to heat the fences 46. The fences 46 may be mounted either adjacent the boundary bushing tips 47 for radiant heat transfer to the tips 47 or in direct contact with the boundary tips 47 for both radiant and conductive heat transfer to the boundary tips 47.

Figure 7:
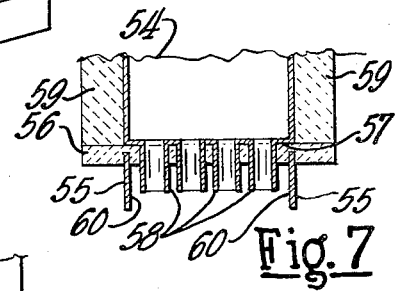
FIG. 7 is a fragmentary view, in section, of a bushing having a fence mounted adjacent boundary tips in a refractory bushing support.
Figure 9:
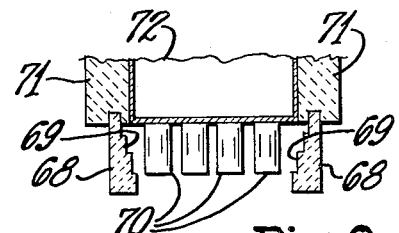
FIG. 9 is a fragmentary view, in section, of a bushing having a stepped fence adjacent boundary tips.
Figure 8:
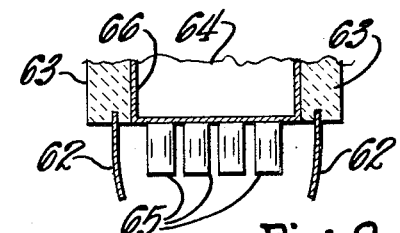
FIG. 8 is a fragmentary view, in section, of a bushing having a curved fence mounted in a refractory bushing support for focusing reflected heat on boundary tips.

Turning now to FIGS. 7–9, several alternate types of fences are shown. A bushing 54 is shown in FIG. 7 having a fence 55 mounted in a refractory coating 56. The refractory coating 56 extends across a bottom 57 of the bushing 54, around upper ends of an array of orificed tips 58, and is attached to a refractory bushing support 59. When the fence 55 is heated, heat energy will be conducted through the coating 56 to the upper ends of the array of tips 58 and will be radiated to the lower ends of the boundary tips in the array of tips 58. If, on the other hand, the fence 55 is not heated from an external energy source, the coating 56 will conduct heat from upper ends of tips in the array of tips 58 and from the bushing bottom 57 to the fence 55. Surfaces 60 of the fence 55 facing boundary tips in the array of tips 58 are provided with a heat reflective coating to reflect a high percentage of the heat radiated by the array of tips 58 back to the boundary tips. Gold is exemplary of one good coating material for the surfaces 60.

In FIG. 8, fences 62 are mounted directly in a refractory support 63 for a bushing 64. The fences 62, which are coated to reflect a high percentage of heat radiated by an array of orificed tips 65, are curved to direct or focus reflected heat on, and thereby heat, boundary tips of the array of tips 65. The fences 62 may be heated by an external power source or by conduction through the refractory bushing support 66, in a manner similar to that described above for FIG. 7.

Another embodiment of a fence is shown in FIG. 9. Fences 68 having stepped inner surfaces 69 facing boundary tips in an array of orificed tips 70 are mounted in a refractory support 71 for a bushing 72. The fences 68 are formed from a refractory material and are provided with heat reflective coatings on the stepped inner surfaces 69. The stepped inner surfaces 69 reduce the circulation of cooling air currents around the boundary tips and reflect a high percentage of heat radiated by the array of tips 70 to the boundary tips.

While the invention has been described in connection with several preferred embodiments, it should be expressly understood that various other changes may be made in the bushing and fence designs without departing from the invention as defined in the appended claims.

What I claim is:

1. Apparatus for producing glass filaments comprising, in combination, a bushing for feeding glass in molten form, first means for heating said bushing, an array of orificed tips in a wall of said bushing through which streams of the molten glass are emitted, a fence mounted adjacent boundary tips in said array of tips, second means for heating said fence to reduce heat losses from said boundary tips, means for controlling said second heating means independently of said first heating means whereby heat losses from said boundary tips are reduced to essentially the same as heat losses from the remaining ones of said tips, and means associated with said bushing for attenuating the streams of molten glass into filaments.

2. Apparatus for producing glass filaments, as defined in claim 1, wherein said second means for heating said fence includes means for electrically heating said fence.

3. Apparatus for producing glass filaments, as defined in claim 1, wherein said second means for heating said fence is a fuel burner.

4. Apparatus for producing glass filaments, as defined in claim 1, wherein said fence has a fluid passage therethrough, and wherein said second means for heating said fence includes means for circulating a heat transfer fluid through the passage in said fence for heating said fence.

5. Apparatus for producing glass filaments, as defined in claim 1, wherein said heated fence is in contact with said boundary tips for supplying heat to said boundary tips by radiation and conduction.

6. Apparatus for producing glass filaments comprising, in combination, a bushing for feeding glass in molten form, first means for heating said bushing, an array of orificed tips in a wall of said bushing through which streams of the molten glass are emitted, a refractory support for said bushing, a fence mounted to project from said refractory support for supplying radiant heat to boundary tips in said array of tips, second means for heating said fence, means for controlling said second heating means independently of said first heating means whereby heat losses from each tip in said array are substantially uniform, and means associated with said bushing for attenuating the streams of molten glass into filaments.

7. Apparatus for producing glass filaments, as defined in claim 6, wherein said second heating means comprises means for electrically heating said fence whereby said fence radiates heat to said boundary tips.

8. Apparatus for producing glass filaments, as defined in claim 6, wherein said fence has a surface facing said boundary tips which is highly reflective of radiant heat.

9. Apparatus for producing glass filaments, as defined in claim 8, wherein said fence surface is of gold.

10. Apparatus for producing glass filaments, as defined in claim 8, wherein said fence surface is curved to focus radiant heat on the outer ones of said tips.

11. Apparatus for producing glass filaments, as defined in claim 8, wherein said second means for heating said fence includes means for electrically heating said fence.

12. Apparatus for producing glass filaments, as defined in claim 6, wherein said refractory support extends over said bushing wall and surrounds the ends of said tips adjacent to said bushing wall.

13. Apparatus for producing glass filaments, as defined in claim 6, wherein said fence is formed from refractory material and at least a portion of the surface of said fence facing said boundary tips is coated with a material which is highly reflective of radiant heat.

14. Apparatus for producing glass filaments, as defined in claim 13, wherein said coated fence surface is shaped to focus reflected radiant heat on said boundary tips.

References Cited
UNITED STATES PATENTS

| | | | |
|---|---|---|---|
| 3,068,669 | 12/1962 | Fiedler | 65—1 |
| 3,233,991 | 2/1966 | Stalego | 65—11 W |
| 3,333,933 | 8/1967 | Mitchell | 65—1 X |

S. LEON BASHORE, Primary Examiner

R. L. LINDSAY, Jr., Assistant Examiner